A. C. CHAMBERLAIN.
Plant Basket.

No. { 2,770.
33,774, }
Patented Nov. 26, 1861.

Witnesses:
J. W. Coombs
R. S. Spencer

Inventor:
A. C. Chamberlain
per Munn & Co.
Attorneys

UNITED STATES PATENT OFFICE.

ALFRED C. CHAMBERLAIN, OF NEWPORT, RHODE ISLAND.

IMPROVED METHOD OF GROWING PLANTS AND FRUITS.

Specification forming part of Letters Patent No. 33,774, dated November 26, 1861.

*To all whom it may concern:*

Be it known that I, A. C. CHAMBERLAIN, of Newport, in the county of Newport and State of Rhode Island, have invented a new and Improved Basket for Growing Fruits, such as grapes, peaches, nectarines, pears, and all kinds of plants; and I do hereby declare that the following is a full, clear, and exact description thereof, reference being had to the accompanying drawings, making a part of this specification, in which—

Figure 1:
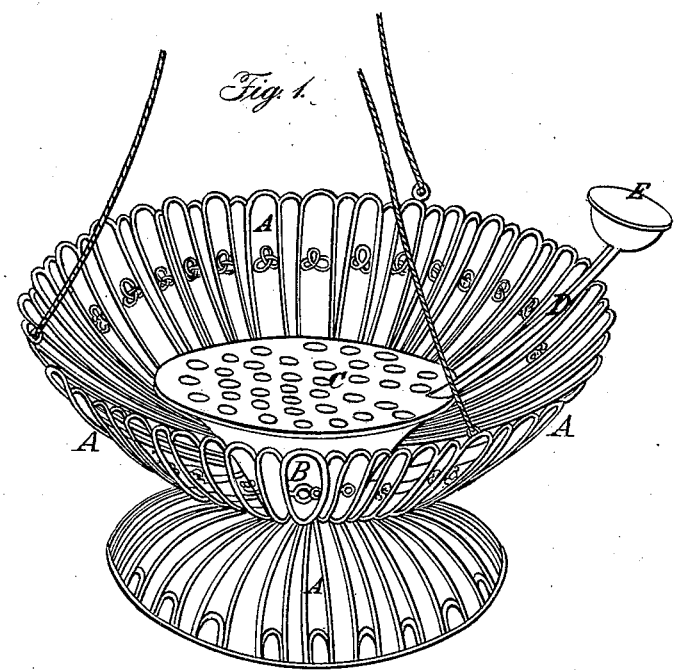
Figure 2:
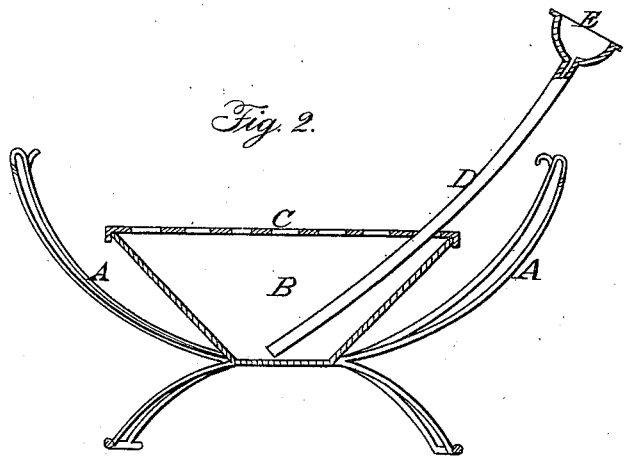

Figure 1 is a perspective view of the improved basket. Fig. 2 is a section through the basket.

Similar letters of reference indicate corresponding parts in both figures.

The object of this invention is to grow any desirable variety or kind of fruit or flowers in a light wire basket, which may be suspended from the roof of a green-house or parlor, or it may stand on a table. The basket is to be so constructed that the vines or stems of flowers, or both combined, may be cultivated in the basket and shoot out and hang down from the top and sides of the same, forming a very beautiful ornament for a parlor or green-house.

To enable others skilled in the art to make and use my invention, I will proceed to describe its construction and operation.

A is a light wire-work basket, though it may be made of any suitable material. The open wire basket will be preferable for general purposes, as it will have a better appearance, and allow the vines or flowers, as the case may be, to entwine around it and to pass through the meshes and hang down from its bottom, as well as from its edge. In the bottom of this basket A an inverted conical cup, B, of a suitable capacity, is secured, which is covered with a thickly-perforated plate, C, that is secured down to the cup B.

D is a tube which reaches from the bottom of the cup B above the basket any suitable height. This tube may stand in either a vertical or an inclined position, and it has a wide funnel-shaped mouth, E.

In the cup B is put a mixture of bone-dust and charcoal, sand, or earth, and around the outside of the cup, between the basket and the cup, is placed a suitable quantity of moss to hide the receptacle B and give the basket a more ornamental appearance.

The plants to be grown—which may be grape-vines, peach-trees, or other fruits and flowers—are placed with their roots resting upon the upper surface of the perforated plate C, which may be made slightly concave. The roots of the plants soon send out fibers in search of nutriment, and these fibers pass through the perforations in the plate C into the contents of the receptacle B. The office of the plate is to prevent the undue downward extension and growth of the plant, and also to preserve a proper space for the supply of moisture and food to the roots. Without the plate C the plant would soon extend downward and increase in bulk and completely fill the vessel B, so as to render its further cultivation impossible.

Liquid manure is designed to be introduced to the roots through the pipe D.

By means of this improvement grapes, peaches, pears, plums, cherries, nectarines, strawberries, and every description of fruits and flowers may be dwarfed, grown, and ripened in the utmost perfection. The ordinary pots will not answer for this purpose, because they present no means of preventing the downward extension of the plant and no means of holding liquid manure.

My improvement is especially adapted to fruit-growing, because it may be readily transported and placed at proper times in such situations in the green-house or other locality where the plant may enjoy its required heat or atmosphere.

Without the pipe D it would be difficult to supply the roots with liquid manure, for if it were poured upon the plant much of it would be shed by the leaves and never reach the receptacle B; but by the employment of the tube the supply of nutriment to the roots may be always regulated in the most perfect manner.

My improvement is applicable to baskets and vases of every form and description.

Having thus described my invention, what I claim as new, and desire to secure by Letters Patent, is—

1. The construction of a basket or vase for growing fruits and plants, with a perforated plate, C, to receive and hold the plant and a receptacle below the plate for holding the substances from which the plant is to derive nutriment, substantially as herein shown and described.

2. The employment of a filling-tube, D, with said plate and basket, as and for the purposes set forth.

ALFRED C. CHAMBERLAIN.

Witnesses:
STEPHEN P. SLOCUM.
JOHN ELDRED.